I. KENDRICK.
Manufacture of Illuminating Gas and Burning Hydrocarbons.

No. 152,383. Patented June 23, 1874.

Witnesses
Eugene P. Eaton
J. B. Connolly

Inventor
Isaac Kendrick
By Connolly Bros,
Attorneys

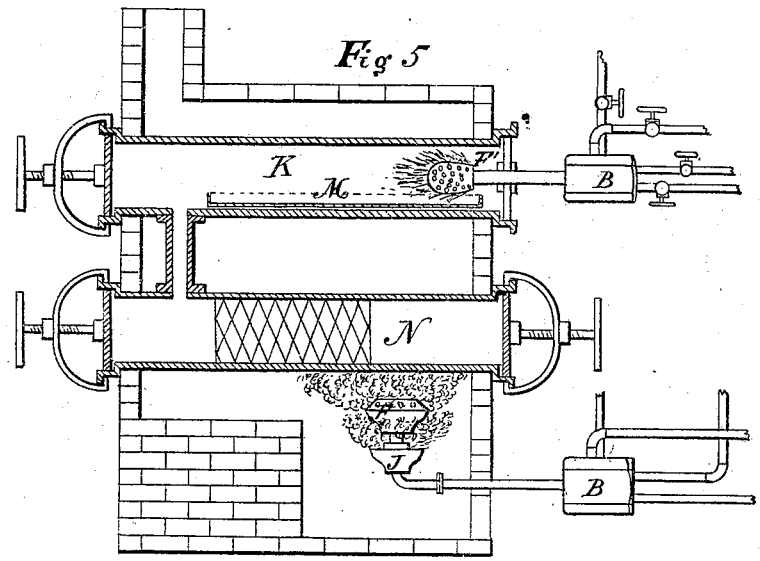
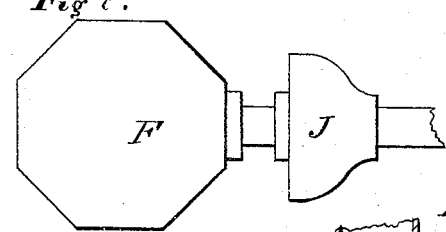
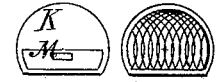
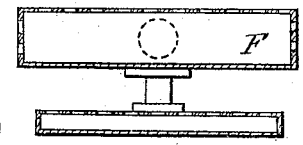
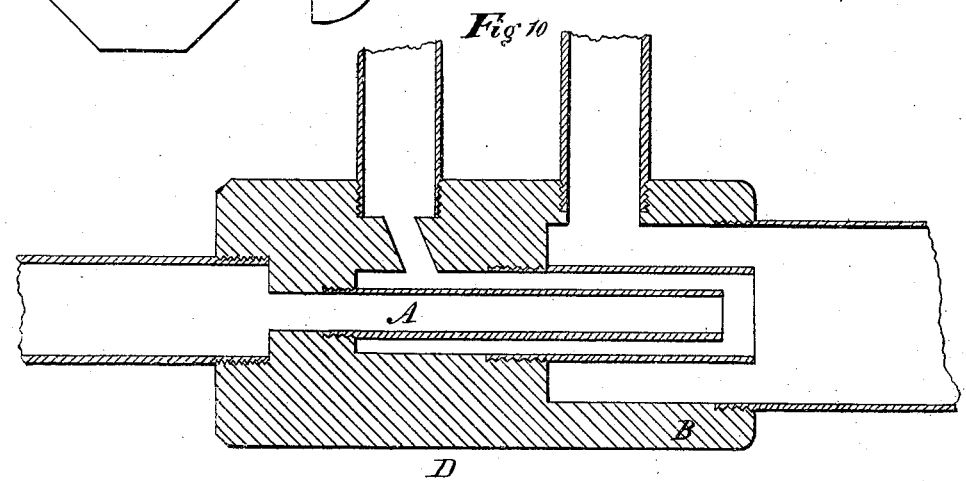

UNITED STATES PATENT OFFICE.

ISAAC KENDRICK, OF PHILADELPHIA, PENNSYLVANIA.

IMPROVEMENT IN THE MANUFACTURE OF ILLUMINATING-GAS AND BURNING HYDROCARBONS.

Specification forming part of Letters Patent No. 152,383, dated June 23, 1874; application filed March 13, 1874.

*To all whom it may concern:*

Be it known that I, ISAAC KENDRICK, of Philadelphia, in the county of Philadelphia and State of Pennsylvania, have invented a certain new and useful Process and Apparatus for Making Illuminating-Gas and Burning Hydrocarbons as Fuel; and I do hereby declare the following to be a full, clear, and exact description of the invention, such as will enable others skilled in the art to which it pertains to make and use it, reference being had to the accompanying drawings, which form part of this specification, in which—

Figure 1:
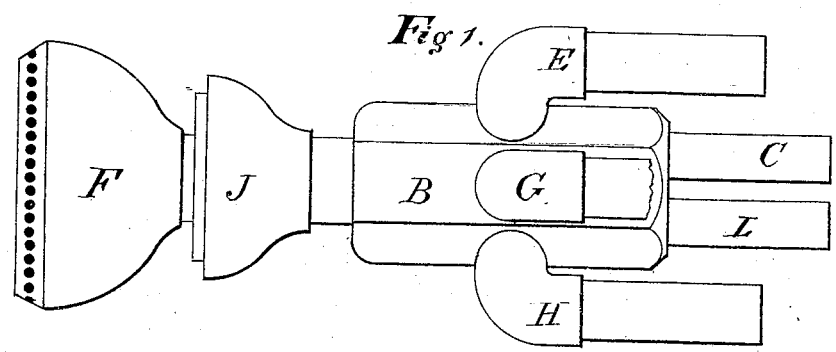
Figure 2:
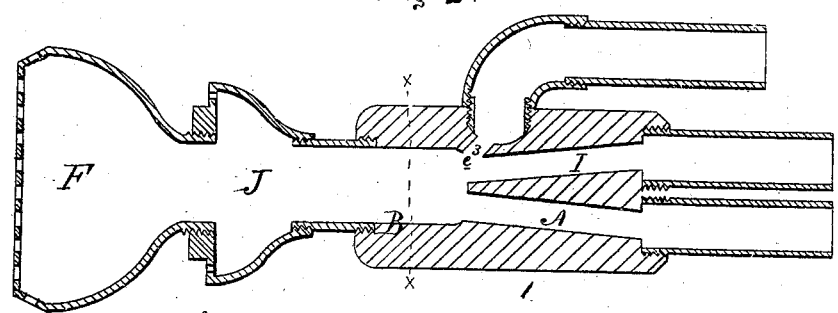
Figure 3:
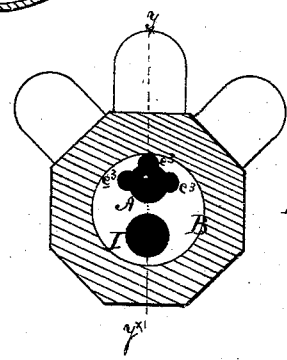
Figure 4:

Figure 1 is a plan; Fig. 2, a longitudinal section in line $y\ y$, Fig. 3; and Fig. 3, a transverse section in line $x\ x$, Fig. 2. Fig. 4 is a longitudinal section of burner used in gas-retort shown in Fig. 5. Figs. 6 and 7 are end views of gas-retorts, showing pan and wire basket therein. Figs. 8, 9, and 10 are detail views of various modifications.

The object of my invention is twofold—to burn liquid hydrocarbons as fuel, and to make illuminating-gas from liquid hydrocarbons, both of which results are accomplished by my herein-described process and apparatus for atomizing and commingling hydrocarbons with the resultant gases of decomposed steam and air, the same being an improvement on the subject of Letters Patent granted to me, and bearing date November 5, 1872, No. 132,839.

In carrying my invention into effect, the liquid hydrocarbons are first atomized and commingled or mixed with decomposed steam and air in a chamber, and are thence forced by the pressure into and distributed in a gaseous or finely-divided condition within a retort for making illuminating-gas, or within a furnace or fire-box for the purposes of fuel. I employ a hollow or chambered casting, of any suitable form, of iron or other metal, within which are three or more chambers, communicating with each other. One of these chambers (called the mixing-chamber) is large. The others are comparatively small. The walls of the large chamber are perforated with inlet holes or openings, which are made to enter, at any desired angle, at or near the junction of the two small chambers with the large one, the several chambers and inlet-openings being so arranged, with respect to each other, that, when steam is introduced, they combine and perform the function of an atomizer, mixer, and injector for commingling the oil, decomposed steam, and air. I also employ what I term a "combined distributing-retort and burner," when applied to heating purposes; or simply a distributer, when used for making illuminating-gas. This device consists of a vessel or chamber of iron, of any suitable shape—as oblong, globular, conical, or cylindrical—perforated with drill-holes, through which the commingled hydrocarbons, gas, decomposed steam, and air are made to issue, and by means of which I not only more effectually mix the oil or gas with the decomposed steam and air, but distribute the same within the furnace or gas-retort in a finely-divided condition. For the purpose of heating the distributing-retort I employ a device, made of any suitable metal, consisting of a hollow cone-shaped chambered cylinder or pipe, having numerous small perforations, so arranged that the flame of the vapors issuing therefrom are made to bear upon the said distributing-retort, heating it, and thereby aiding in vaporizing and preparing the commingled oil, decomposed steam, and air for immediate ignition and combustion. This device I design to employ only in the manufacture of heating-gas. For the purpose of receiving and retaining the undecomposed oil and other impurities usually deposited in the bottom of gas-retorts, in which oil, decomposed steam, and air are introduced, I place in such gas-retorts a pan, made to fit loosely therein, so that it may be readily removed, cleansed, and returned. I also employ, in this connection, an open-work or skeleton basket or frame, of iron or other metal, placed within a gas-retort, the object of which is to hold scrap-iron, coke, charcoal, brick, lime, or other equivalent substance, through which the evolved gas is made to pass. This basket or frame I also make to fit the retort loosely, so that it and its contents may be easily removed and replaced when desired.

Referring to the accompanying drawings, B is the large chamber, in which the liquid hydrocarbons, decomposed steam, and air, or gas, decomposed steam, and air, are commingled, the decomposed steam entering said chamber through the inlet or pipe I, the air or gas through the inlet A, these two inlets forming an acute angle at their junction and entrance into chamber B. $e^3$ shows the inlets through which oil, gas, or air is taken or drawn into chamber B, said inlets entering said chamber at any angle at or near the junction of chambers A and I. F represents the distributing-retort or burner, and J the device for heating said retort, consisting of a conical chambered vessel, or a cylinder or pipe, perforated at $j$. C is a pipe, screwed into the end of the inlet I, through which steam is admitted from a decomposing apparatus, the current being regulated by a suitable cock. L is a similar pipe for supplying air to the chamber A, the flow being also governed by a cock; and E G H represent pipes, through which oil, gas, or air is admitted to chamber B through the inlet-holes $e^3$, the flow being controlled by suitable cocks or valves.

For manufacturing illuminating-gas the above-described apparatus is used as follows: One or more (three preferred) of the usual iron or clay cylindrical retorts, as also a boiler for generating steam, are set over an ordinary furnace in such position that their temperature may be graduated—that is, while one (the upper) may be brought to a dull-red heat, the lower ones may be heated to a high temperature, bright-red heat. The ends of these retorts are closed by movable head-pieces, and to the inside of the end piece of the upper or lowest-heated retort I affix the distributer F', and connect by a pipe through the same to the outlet of the atomizer and injector, placed outside of the retort, and connected, by suitable pipes, with the reservoir of hydrocarbons, and with the steam-decomposing apparatus a third pipe leading to the open air. If desired, a fourth pipe may connect the atomizer and injector with a gas-holder or gas-well. The parts being thus arranged, a fire is started in the furnace, and when the retorts are sufficiently heated, and the required resultant gases of decomposed steam obtained, the hydrocarbons are admitted through pipes E, G, or H. At the same time resultant gases of decomposed steam are admitted through pipe C, and air through pipe L; or, when desired, gas may be introduced in place of air. The oil is drawn in through either of the inlet-holes $e^3$, and impinge and atomized by the resultant gases of decomposed steam. A current of air is also drawn into the chamber B through the inlet A, and commingled with the resultant gases of decomposed steam and oil in chamber B. The mingled steam, oil, and air are injected, by the force of the resultant gases of decomposed steam, into the heated retort, where they are rapidly vaporized. The undecomposed portion of the oil, in the shape of tar and other impurities, is deposited in the pan within the retort, whence they can be removed and used over again mixed with oil, and thus continued until converted into gas. The light volatile vapors or gases, chemically combining, traverse the entire length of the retort, and pass thence through one or more highly-heated (bright-red) retorts, and issue thence in the form of a fixed illuminating-gas, which is not affected by low temperature, storage, or transmission to any reasonable distance, and suffers no mechanical separation or deterioration of illuminating power. When the apparatus is used for heating purposes, the commingled oil, decomposed steam, and air are together projected into and through the distributer placed within the furnace at a pressure corresponding to that of the steam, thus insuring a powerful blast, perfect combustion, and a more intense heat than can be had in any other way.

In the accompanying drawing, K shows the upper retort, and M the pan therein; N N, the lower retorts, having the skeleton frame or basket C. This device is designed to fit the diameter of the retort, so as to prevent the gas from going around it, while permitting its easy removal from the retort with its contents. I am aware that charcoal or coke has been held in suspension upon a grating within the retort, beneath which hydrocarbons were discharged, the gases evolved therefrom passing up and through the suspended body; but my basket is distinguishable therefrom, as it fills the diameter of the retort, instead of being suspended therein, thus compelling the gases to pass through it, and permitting its ready removal. F' shows the distributer in the upper retort, and F the distributer and burner, having the heating device J located beneath the lower retorts.

I am aware that hydrocarbons and steam, as also air, have been separately introduced into retorts for making gas; but my invention is distinguished from all previous efforts by this peculiarity, viz., that the hydrocarbons are disintegrated and thoroughly mixed or combined with the resultant gases of decomposed steam and air before they are taken into the retort, and then distributed therein in a finely-divided condition. By this means, the combined oil, decomposed steam, and air are together brought directly to the action of the heated retort, and are readily and rapidly combined chemically, thus requiring a less heated retort than when oils are introduced in a body uncombined with said decomposed steam. In this way the steam furnishes the necessary equivalent of hydrogen to take up the excess of carbon, and thereby prevents the formation of solid carbon, as occurs when the hydrocarbons uncombined are brought in contact with the highly-heated (bright-red) retort, by reason of the destructive distillation. The gas thus produced may be enriched or impoverished at pleasure by increasing or diminishing the quantity of decomposed steam and air, and is believed to be perfectly free from bisulphide of carbon, requiring no purification. The light carbonic acid and oxide vapors, chemically uniting with the hydrocarbons, are allowed to remain, their removal being unnecessary in a sanitary point of view, the illuminating power of the gas being sufficiently high, notwithstanding their presence. In order to prevent chilling of the steam and condensation in the mixing-chamber, I prefer to have the hydrocarbons and air slightly heated before admission to said chamber.

I do not limit myself to the precise construction or arrangement of the devices above described, as it is manifest the same may be varied without changing the principle. For instance, steam may be admitted through chamber A, or gas, when desired, may be taken in through chamber I, and air through inlets $e^3$; also, the distributer F and the mixing-chamber B may be greatly varied in form without changing their principle of operation; or the hollow chambered casting D may be constructed as shown in Fig. 10, A being the steam-pipe, $B^3$ the oil-pipe, and N the air or gas pipe.

The decomposition of the steam employed may be effected by any of the methods known in the art, as by passing it over red-hot metal, or through a red-hot cylinder or pipes containing iron turnings.

What I claim as my invention is—

1. The process of making illuminating-gas by first decomposing steam, and bringing the resultant gases in contact with liquid hydrocarbons in a mixing-chamber, simultaneous with the admission and commingling of a current of air, and then conducting and injecting the mixture into a heated retort, wherein the components chemically combine, substantially as set forth.

2. The process of burning liquid hydrocarbons as fuel by first bringing the resultant gases of decomposed steam in contact with liquid hydrocarbons in a mixing-chamber, simultaneous with the admission and commingling of a current of air, thence conducting and injecting the mixture into a fire-box or furnace through a perforated distributer in a finely-divided condition, substantially as described.

3. The within-described process for burning gas from gas-wells, by bringing said gas in contact with the resultant gases of decomposed steam in a mixing-chamber, simultaneous with the admission and commingling of a current of air, thence conducting and injecting the mixture into a fire-box, furnace, or retort in a finely-divided condition, for the purposes of fuel or illumination, substantially as described.

4. The device herein described, containing the communicating chambers B, A, and I, and inlet-holes $e^3$, made to enter chamber B at or near the junction of chambers A and I, substantially as shown and described.

5. The distributing-retort F, for use within a fire-box, furnace, or gas-retort, substantially as shown and set forth.

6. The devices J, as herein described, for heating distributing-retort F, as shown and described.

7. The basket C, fitting the diameter of the retort, and constructed for easy removal with its contents therefrom, substantially as shown and described.

In testimony that I claim the foregoing I have hereunto set my hand this 11th day of March, 1874.

ISAAC KENDRICK.

Witnesses:
JOHN RODGERS,
EUGÈNE P. EADSON.